United States Patent [19]

Zabron et al.

[11] 4,124,423
[45] Nov. 7, 1978

[54] METHOD OF FORMING SELVAGE EDGE FINISH ON MULTI-PLY BELTING

[75] Inventors: Floyd S. Zabron, West Seneca; Richard F. Jankowski, Elma, both of N.Y.

[73] Assignee: Albany International Corp., Albany, N.Y.

[21] Appl. No.: 787,287

[22] Filed: Apr. 13, 1977

[51] Int. Cl.² ............................................. D06C 25/00
[52] U.S. Cl. ................................. 156/88; 156/137; 156/211
[58] Field of Search ................. 156/211, 137, 88, 267, 156/268; 74/232

[56] References Cited

U.S. PATENT DOCUMENTS

| | | | |
|---|---|---|---|
| 1,266,789 | 5/1918 | Gilmer | 74/232 |
| 1,326,656 | 12/1919 | Gilmer | 74/232 |
| 1,378,379 | 5/1971 | Radell | 74/232 |
| 3,007,826 | 11/1961 | Brooksbank | 156/137 |
| 3,217,555 | 11/1965 | Brooksbank | 156/211 |
| 3,393,115 | 7/1968 | Hainsworth et al. | 156/137 |

Primary Examiner—William A. Powell
Assistant Examiner—William H. Thrower
Attorney, Agent, or Firm—Kane, Dalsimer, Kane, Sullivan and Kurucz

[57] ABSTRACT

The disclosure is of a method of forming a mock selvage edge finish on a multi-ply, solid woven belting.

3 Claims, 8 Drawing Figures

METHOD OF FORMING SELVAGE EDGE FINISH ON MULTI-PLY BELTING

BACKGROUND OF THE INVENTION

1. Field of the Invention

The invention relates to multi-ply, solid woven belting and more particularly relates to a method of forming a mock selvage edge finish on such belting.

2. Brief Description of the Prior Art

Belting materials, particularly endless fabric based beltings are generally cut to a desired width from wider materials, leaving raw edges of exposed fabric. The exposed fabric edges have a tendency to ravel over a period of time, leading to edge wear and shortened operating life. Heretofore, several methods have been employed to protect the raw edge of such belting to prevent ravel of the exposed fabric. For example, one method comprises coating the cut edge of the belting with a resin solution, leaving a film of resin over the exposed fabric edge. Several applications of resin may be required for adequate protection. Another method of the prior art has been to secure a U-shaped cap over the edge (see U.S. Pat. No. 3,840,424). Still another method has been to remove a portion of the fabric backing at the belt edge and folding the top cover over the edges and securing the folded portion to the fabric backing. Other methods of protecting belt edges are represented by the disclosures of U.S. Pat. Nos. 924,213; 2,295,133; 2,672,169; 2,709,668; 2,744,844; 3,007,826; and 3,393,115.

In general, the prior art methods of protecting a cut belt edge have not been entirely satisfactory, particularly in regard to multi-ply, solid woven beltings. The stresses imposed on running belts may cause folded structures to split along the fold lines. Sealant coverings are not always acceptable for all uses and under operating conditions may tear loose.

By the method of this invention, a continuous mock selvage edge finish may be formed on the cut edges of solid woven belting such as solid woven cotton belting. The edge finish is highly stable on a running belt and is readily formed with simple apparatus and a minimum of training. By the method of the invention, belting with a protected edge may be produced in any desired width without the need to weave the belting to the specified desired width. Instead, the belting may be cut to the desired width and the cut edge protected from potential ravel.

SUMMARY OF THE INVENTION

The invention comprises a method of forming a mock selvage edge finish on a multi-ply, solid woven belting which includes a base outer ply and a cap outer ply, which comprises; (a) identifying side margins of said belting on each lengthwise side of the belting, defined by the corresponding lengthwise edges of the belting and by a center zone of the belting between the side margins; (b) removing the cap outer ply in the side margins; (c) removing the outside edge of any plies intermediate to said cap ply and base ply, in the side margins, inwardly from the belting side edge a distance equal to approximately one-half the width of the side margin plus the thickness of the intermediate plies, whereby a portion of the inner surface of the base ply is exposed; (d) applying adhesive to at least one of the inner surfaces of said base ply and the exposed surfaces of any intermediate plies; (e) folding each portion of the base ply free of overlying ply over so that its outer edge abuts the center zone of the cap ply; and (f) curing the adhesive; whereby a mock selvage finish is formed on the side edges of said belting.

The term "solid woven" is employed to mean a multiple ply textile fabric in which the various plies are held together by binding threads, with the whole fabric produced in one weaving operation, i.e.; it is not a series of plies woven separately and then stitched or otherwise joined together subsequent to weaving. The term in this sense refers to the completion of the fabric and does not hold reference to ply density.

DETAILED DESCRIPTION OF THE PREFERRED EMBODIMENTS OF THE INVENTION

Figure 1:
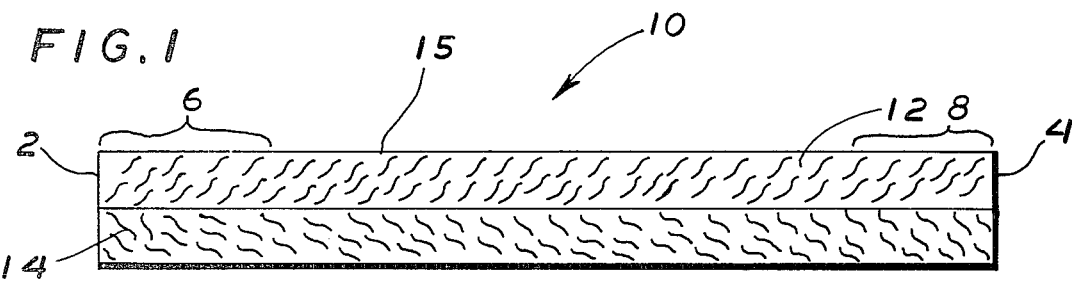
FIG. 1 is a cross-sectional side elevation across the width of a two-ply belting material.

The method of the invention will be described with reference to the accompanying drawings of FIGS. 1 through 8, inclusive. FIG. 1 is a cross-sectional side elevation along the width of a two-ply, solid woven belting material 10. The upper ply 12 is a cap ply and the lower ply 14 is a base ply. The belting 10 may be selected in any desired length and in a width exceeding the desired belt width for the final product. In general, the width for the material 10 will be more than a width calculated by the formula:

$$A + (2 \times B) - (2 \times C)$$

wherein $A$ is the desired width of the finished belt, $B$ is the total thickness of any plies between the base ply 14 and the cap ply 12 and $C$ represents the thickness of the base outer ply 14 (note there are no intermediate base plies in the embodiment shown in FIG. 1). Although the belting 10 as initially provided may have any width larger than that described above, in the preferred embodiment of the invention it will have a width which is less than a width calculated by the formula:

$$(2 \times A) + (2 \times B) - (2 \times C)$$

wherein $A$, $B$ and $C$ are as previously defined. The belting 10 possesses a first side edge 2 and a second side edge 4. The side edges 2, 4 run along the length of belting 10. The next step in the method of the invention is to identify side margins of the belting 10, which parallel the lengthwise side edges 2 and 4. The side margins 6 and 8 have been identified in belting 10 as shown in FIG. 1. The side margins 6, 8 have a width beginning at side edges 2 and 4, respectively, and extending toward the center of belting material 10. The side margins 6 and 8 are separated from each other by a center zone 15. In the preferred method of the invention, the width of each side margin is determined to be greater than B as defined above but less than the distance calculated by the formula:

$$A + B - C$$

wherein $A$, $B$ and $C$ are as previously defined, the sum of the widths of the side margins 6, 8 being equal to the distance calculated by the formula:

$$A + (2 \times B) - (2 \times C) - D$$

wherein $A$, $B$ and $C$ are as defined above and $D$ equals the width of the center zone 15.

Figure 2:
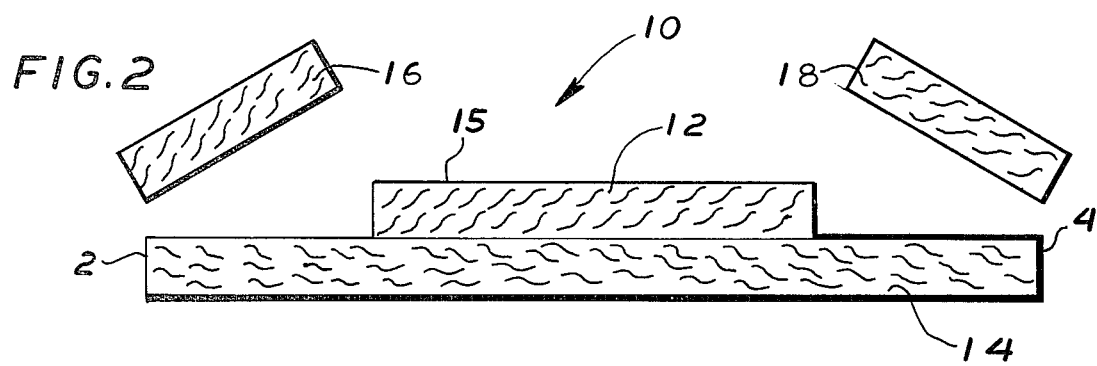
FIG. 2 is a view as seen in FIG. 1 but after removal of the cap ply in side margins of the belting.
Figure 3:
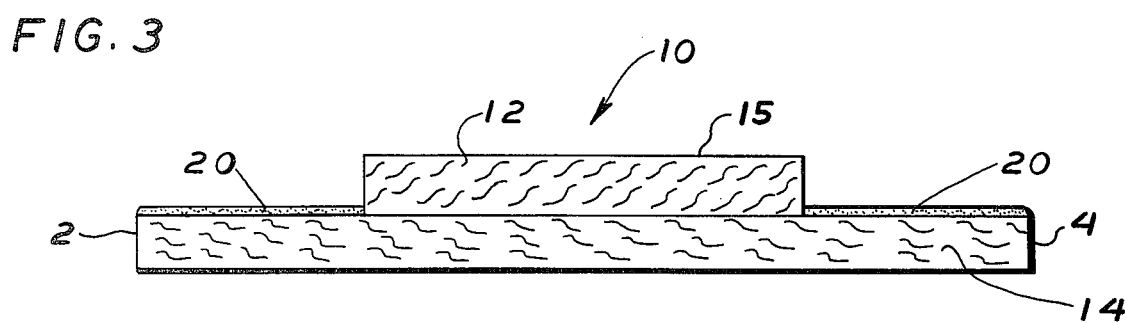
FIG. 3 is a view as seen in FIG. 2 but following application of an adhesive.
Figure 4:
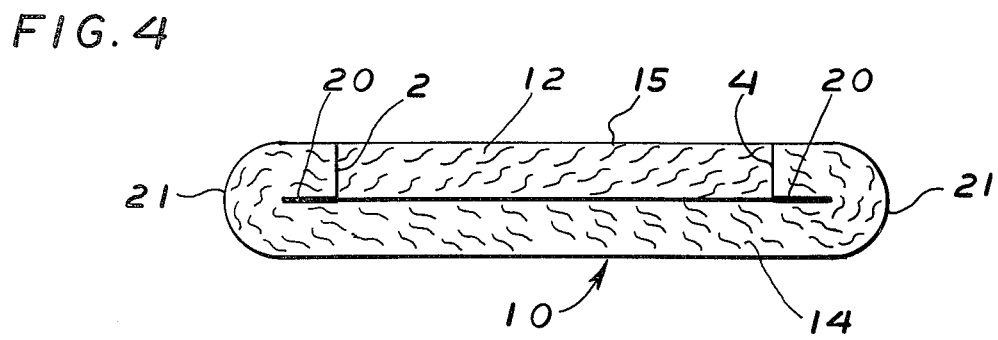
FIG. 4 is a view of the belting seen in FIGS. 1 through 3, but following formation of a mock selvage edge finish.

Referring now to FIG. 2, the next step of the method of the invention comprises removal of the cap layer 12 within the side margins 6, 8. As shown in FIG. 2, side margin cap material 16 and side margin cap material 18 has been removed by passage of the belt material 10 through a skiver. As next shown in FIG. 3, an adhesive 20 is applied to the exposed upper surface of base ply 14. The base ply 14 within side margins 6, 8 is then folded over upon itself as shown in FIG. 4 so that side edges 2, 4 abut with center zone 15 of cap ply 12. The folded material may then be passed through a nip roll to seal the mock edge 21 formed on the sides of belt 10, so that it conforms with the body of the belt 10. Upon setting of the adhesive 20, a stable, mock selvage edge finished belt 10 is obtained.

Figure 5:
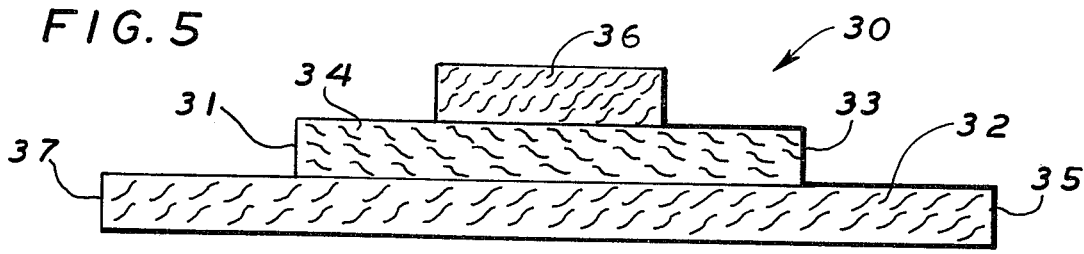
FIG. 5 shows a cross-sectional side elevation of a three-ply belting material prepared to form a mock selvage edge finish.
Figure 6:
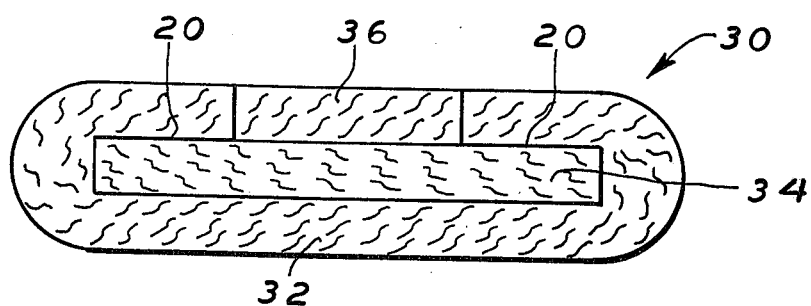
FIG. 6 is a view of the belting seen in FIG. 5 but after formation of the selvage edge finish.

Referring now to FIG. 5, one may see a cross-sectional side elevation across the width of a three ply belting material 30 which has been prepared by identifying and removing those portions of cap ply 36 determined to be in the side margins as previously defined. In addition, the side edges of intermediate ply 34 have been cut back to expose the upper surface of base ply 32 within the side margin. The edges 31, 33 of intermediate ply 34 have been cut back a width equal to approximately one-half the width of the side margin plus the thickness of the intermediate ply 34. An adhesive 20 may then be applied to the exposed upper surface of base ply 32 and the ends 35, 37 of base ply 32 are folded upward to abut the edges of cap ply 36 as shown in FIG. 6. The adhesive 20 is allowed to cure as previously described to provide a belt 30 having mock selvage edge finish as shown in FIG. 6.

Figure 7:
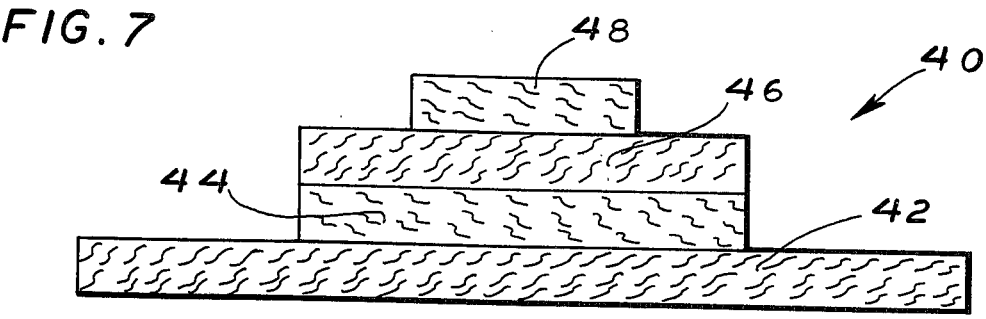
FIG. 7 is a cross-sectional side elevation of a four-ply belting material prepared for selvage edge finishing.

Referring now to FIG. 7, a cross-sectional side elevation of a four ply belting material 40, one may again see how the method of the invention is applied to multi-ply, solid woven belting materials.

Figure 8:
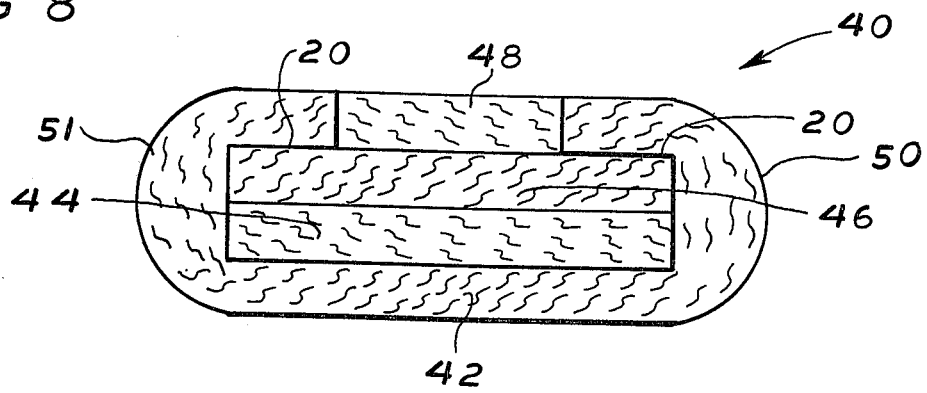
FIG. 8 is a cross-sectional side elevation of the belting material shown in FIG. 7 but after formation of the mock selvage edge finish.

As shown in FIG. 7, the solid woven, multi-ply belting material has been prepared in accordance with the method of this invention by removing those portions of cap ply 48 which had occupied the identified side margins. In addition, intermediate plies 44, 46 have had their outer edges cut back within the side margin according to the preferred formula described above. This has left the upper surface of base ply 42 exposed. Adhesive 20 is placed on the exposed upper surface of base ply 42 and base ply 42 on each side is folded upwards to abut the cap ply 48 as shown in FIG. 8, a cross-sectional side elevation showing the formed mock selvage edge 50, 51 for the embodiment belt 40.

Those skilled in the art will appreciate that many modifications may be made to the above described method of our invention without departing from the spirit and scope thereof. For example, additional steps may be taken to remove frayed edges or to chemically treat the cut edges of the belting material prior to carrying out the steps of the invention.

What is claimed is:

1. A method of forming a mock selvage edge finish on a multi-ply, solid woven, textile belting, said multi-plies including a base outer ply and a cap outer ply, which comprises;
(a) providing said belting in a desired length and a width which is
 (1) less than a width calculated by the formula:

$$(2 \times A) \times (2 \times B) - (2 \times C)$$

wherein $A$ is the desired width of the finished belt, $B$ is the total thickness of any plies between the base ply and the cap ply and $C$ represents the thickness of the base outer plies; and
 (2) more than a width calculated by the formula:

$$A + (2 \times B) - (2 \times C)$$

wherein $A$, $B$ and $C$ are as previously defined; said belting having outer first and second square side edges along its length, a first side margin parallel to said first edge and having a width beginning at said first edge and extending towards said second edge, a second side margin parallel to said second edge and having a width beginning at said second edge and extending towards said first edge and a center zone between said first and second side margin and parallel thereto, the width of each side margin being more than B as defined above but less than the distance calculated by the formula:

$$A + B - C$$

wherein $A$, $B$ and $C$ are as previously defined, the sum of the widths of the side margins being equal to the distance calculated by the formula:

$$A + (2 \times B) - (2 \times C) - D$$

wherein $A$, $B$ and $C$ are as defined above and $D$ equals the width of the center zone;
removing in a square cut the cap ply in the side margins, whereby there is exposed any intermediate plies in the side margins between the cap ply and the base ply and a portion of the inner surface base ply in the absence of intermediate plies;
removing in a square cut the outside edge of an intermediate ply in the side margin inwardly from the belting side edge a distance equal to one-half the width of the side margin plus B as previously defined, whereby a portion of the inner surface of the base ply is exposed;
(c) applying adhesive at least to one of the inner surfaces of said base ply and the exposed surfaces of any intermediate plies;
(d) folding each portion of the base ply free of overlying ply over so that the outer square edge abuts the square-cut center zone of said cap ply; and
(e) curing said adhesive;
whereby a mock selvage finish is formed on the side edges of said belting in the desired width.

2. The method of claim 1 wherein said multi-ply belting comprises two plies.

3. The method of claim 1 wherein said side margins have equal width.

* * * * *

UNITED STATES PATENT OFFICE
CERTIFICATE OF CORRECTION

Patent No. 4,124,423    Dated November 7, 1978

Inventor(s) Floyd S. Zabron and Richard F. Jankowski

It is certified that error appears in the above-identified patent and that said Letters Patent are hereby corrected as shown below:

At Column 4, Claim 1, line 8, "(2 x A) x (2 x B) - (2 x C)"

should read -- (2 x A) + (2 x B) - (2 x C)

Signed and Sealed this

Thirteenth Day of February 1979

[SEAL]

*Attest:*

RUTH C. MASON
*Attesting Officer*

DONALD W. BANNER
*Commissioner of Patents and Trademarks*